Sept. 11, 1928.
C. P. RANDOLPH
1,684,242
PERCOLATOR
Filed Dec. 13, 1926
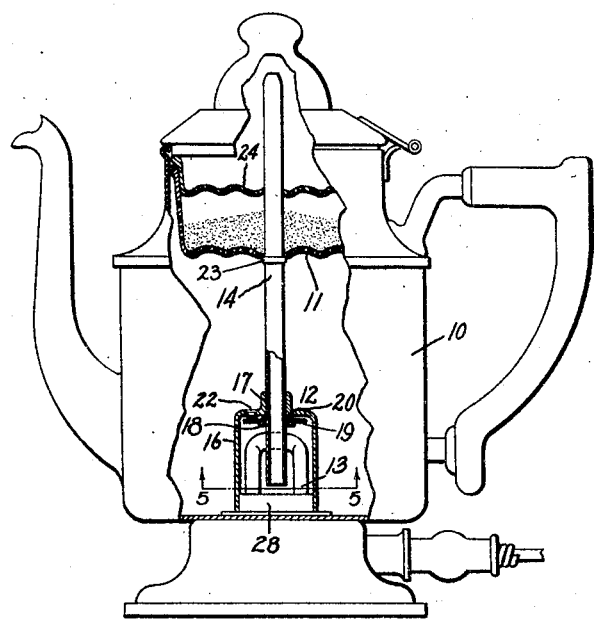
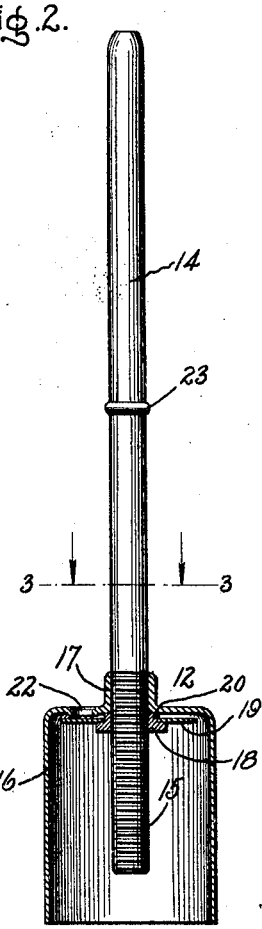
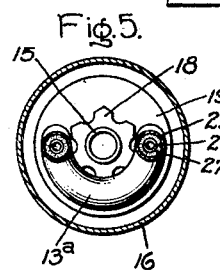
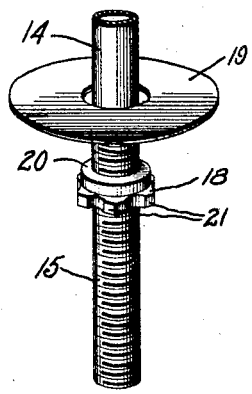
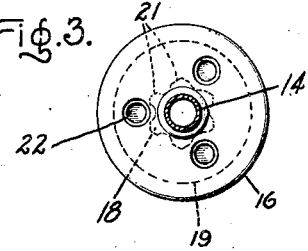
Inventor:
Charles P. Randolph,
by Alexander S. Lanit.
His Attorney.

Patented Sept. 11, 1928.

1,684,242

UNITED STATES PATENT OFFICE.

CHARLES P. RANDOLPH, OF OAK PARK, ILLINOIS, ASSIGNOR TO EDISON ELECTRIC APPLIANCE COMPANY, OF CHICAGO, ILLINOIS, A CORPORATION OF NEW YORK.

PERCOLATOR.

Application filed December 13, 1926. Serial No. 154,357.

My invention relates to percolators such, for example, as are used in the making of coffee and has for its object the provision of a simple, reliable and inexpensive utensil of this character.

More specifically, my invention has particular application to an improved construction and arrangement of a pumping device for percolators.

For a more complete understanding of my invention reference should be had to the accompanying drawing in which Fig. 1 is an elevation view partly in section of a percolator embodying my invention; Fig. 2 is an enlarged view partly in section of the pumping device; Fig. 3 is a sectional view taken along the line 3—3 of Fig. 2 looking in the direction of the arrows; Fig. 4 is a fragmentary view showing the details of construction; while Fig. 5 is a sectional view taken along the line 5—5 of Fig. 1 looking in the direction of the arrows.

Referring to the drawing, I have shown my invention in one form as applied to a small pot for making coffee. This pot is provided with the usual container 10 for the liquid coffee, a ground coffee container 11, a pump 12 by means of which the liquid in the receptacle 10 is pumped upward over the ground coffee, and an electric heating unit 13.

In accordance with my invention the pump comprises a metallic tube 14 provided with a threaded section 15 of considerable length at the lower end. An inverted cup or cap member 16 is secured on this threaded portion 15, the member 16 having a central threaded bore 17 which fits on the threaded portion 15 of the tube. The tube is preferably screwed into the bore 17 for a considerable length, as shown, to the end of the threaded portion whereby the lower end of the tube extends downward inside the member 16 for a considerable distance, terminating substantially midway of the member 16 or somewhat below that point. A nut 18 is also screwed on the threaded portion 15, this nut being inside the cup 16 and providing a support for a washer-shaped valve member 19. As shown, the nut 18 is provided with an upper cylindrical portion 20 which fits loosely in the bore of the valve 19 and holds the valve central of the member 16. The nut 18 is turned upward on the threaded portion until it is seated firmly against the member 16 so as to lock the member 14 in place. To facilitate the assembly and adjustment of the nut it is provided with a series of peripheral projections 21. This arrangement provides for adjustment of the tube 14 with respect to the cap member.

In the upper end of the member 16 are a number of inlet apertures or ports 22, three being shown spaced at equal distances around the tube 14. These ports 22 are situated just above the valve 19 so that when the valve is lifted it will close the ports and prevent the escape of liquid which will then be forced by the steam pressure upward through the tube 14. The valve 19 is preferably made of metal which is comparatively light in weight, such as aluminum, and its weight is further adjusted by regulating its thickness so that it will be easily lifted to close the ports 22 upon the escape of steam or liquid. The member 16, the tube 14 and other parts of the pump are made of suitable non-corrosive metal, which also may be aluminum.

As shown in Fig. 1 the pump when in position in the coffee pot has the cap member 16 resting on the bottom of the pot and placed over the electric heating unit 13, of a suitable form, which is located in the center of the bottom of the pot and projects upward into the interior of the cap member. The tube 14 extends centrally through an aperture provided for it in the ground coffee receptacle 11 which fits in the upper end of the pot. A bead or protuberance 23 is provided on the tube and constitutes a support for the ground coffee receptacle. A suitable perforated water distributor 24 is preferably provided for the ground coffee receptacle, the tube 14 extending through a central aperture provided in the distributor. It will be observed that the ground coffee receptacle is provided with perforations through which the coffee beverage escapes into the pot below.

In the operation of the device the pot is filled with water to a level higher than the top of the cap member 16 so that water flows in through aperture 22 and fills it. This water in the pump is rapidly heated by means of the heater 13 to a boiling temperature and upon the generation of steam the valve 19 is lifted by the escaping water and steam and the outlet ports thus closed, whereby the water is forced upward by steam pressure through the tube 14 from which it falls on to the perforated distributor 24 and thence on to the ground coffee. Upon a subsequent decrease in steam pressure due to the discharge of water from the pump, the valve 19 drops and allows a fresh supply of water to enter the heating chamber through the ports 22.

While any suitable electric heating unit may be used, the heating unit 13 is shown as of a sheathed wire type, such as described and claimed in Patent No. 1,367,341 to Abbott dated February 1, 1921. Briefly, the unit comprises an outer metallic sheath 25 in which a helical resistance conductor 26 is embedded in compacted powered insulating material 27 which forms an efficient conductor of heat between the resistance conductor and the sheath. This unit may be bent into any desired shape and, as shown, the heater 13 comprises a length of this sheathed wire which is bent into the form of a hairpin loop and has its ends secured to a suitable supporting member 28. The supporting member 28 is secured to the bottom of the vessel 10 and extends through an aperture in the bottom. The terminals of the heating unit (not shown) project from the lower side of the support 28 where they are accessible for connection with a suitable electric supply circuit. The upper curved portion 13ª of the loop forming the heating element is bent over laterally, as shown in Fig. 5, so as to partially encircle the lower end of the tube 14 and thereby provide space for the tube which extends downward between the two vertical lengths of the loop.

While I have described my invention as embodied in concrete form and as operating in a specific manner in accordance with the provision of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is:—

1. A percolater comprising a vessel, an electric heating unit secured to the bottom of said vessel so as to project upward into the interior thereof, a cap member set over said heating unit so as to form a heating space, said cap member being provided with an inlet orifice at the top, a tube secured to said cap member and extending through the top of said cap member into said heating space, and a valve in said heating space mounted on said tube arranged to be lifted to close said inlet orifice to prevent discharge of liquid therethrough from said heating chamber.

2. A percolater comprising a vessel, an electric heating unit secured to the bottom of said vessel so as to project upward into the interior thereof, a cap member set over said heating unit forming a heating space, said cap member being provided with an inlet orifice at the top, a tube in screw-threaded engagement with said cap extending centrally through the top of said cap and downward into said heating space, a nut on the threaded portion of said tube inside said cap, and a valve carried by said nut arranged to be lifted to close said inlet orifice to prevent discharge of liquid therethrough from said heating chamber.

3. A percolater comprising a vessel, a looped heating unit secured to the bottom of said vessel extending upward into said vessel, a cap member fitting over said heating unit so as to form a heating space, said cap member being provided with an inlet orifice at the top, a tube extending through the top of said cap member into said heating space and between the lengths of said heating unit, the upper curved portion of said heating unit being bent over laterally to provide space for said tube, and a valve in said cap member arranged to be lifted to close said inlet orifice to prevent discharge of liquid therethrough from said heating chamber.

4. A percolater comprising a vessel, an electric heating unit secured to the bottom of said vessel so as to project upwardly into the interior thereof, a cap member set over said heating unit so as to form a heating space and a tube in screw-threaded engagement with said cap member and extending through the top of said cap member downwardly into said heating space.

5. A percolater comprising a vessel, a looped heating unit secured to the bottom of said vessel extending upwardly into said vessel, a cap member fitting over said heating unit so as to form a heating space and a tube extending through the top of said cap member downwardly into said heating space and between the lengths of said heating unit.

6. A percolater comprising a vessel, a looped heating unit secured to the bottom of said vessel extending upwardly into said vessel, a cap member fitting over said heating unit so as to form a heating space, and a tube extending through the top of said cap member downwardly into said heating space and between the lengths of said heating unit, the upper curved portion of said heating unit being bent over laterally to provide space for said tube.

In witness whereof, I have hereunto set my hand this 7th day of December, 1926.

CHARLES P. RANDOLPH.